United States Patent
Powers et al.

(10) Patent No.: US 8,437,688 B2
(45) Date of Patent: May 7, 2013

(54) TEST AND ANSWER KEY GENERATION SYSTEM AND METHOD

(75) Inventors: John G Powers, Ontario, NY (US); Stuart C. Zak, Rochester, NY (US); Jaden Michael James Bruun, Rochester, NY (US); Elton T. Ray, Lakeville, NY (US)

(73) Assignee: Xerox Corporation, Norwalk, CT (US)

( * ) Notice: Subject to any disclaimer, the term of this patent is extended or adjusted under 35 U.S.C. 154(b) by 659 days.

(21) Appl. No.: 12/337,244

(22) Filed: Dec. 17, 2008

(65) Prior Publication Data

US 2010/0151433 A1     Jun. 17, 2010

(51) Int. Cl.
G09B 23/28     (2006.01)

(52) U.S. Cl.
USPC ........... 434/354; 434/204; 434/215; 434/317; 434/362; 434/365

(58) Field of Classification Search ............. 434/317, 434/362–365, 156, 175–178, 204–207, 215, 434/216
See application file for complete search history.

(56) References Cited

U.S. PATENT DOCUMENTS

| | | | | |
|---|---|---|---|---|
| 3,121,959 A | * | 2/1964 | Uttal | 434/335 |
| 3,154,863 A | * | 11/1964 | La Prelle | 434/345 |
| 4,259,788 A | * | 4/1981 | Wilson | 434/338 |
| 4,355,984 A | * | 10/1982 | Slavik et al. | 434/335 |
| 4,907,163 A | * | 3/1990 | Cook | 700/173 |
| 4,950,167 A | * | 8/1990 | Harris | 434/322 |
| 5,239,476 A | * | 8/1993 | James et al. | 700/159 |
| 5,685,532 A | * | 11/1997 | Amarakoon | 270/58.07 |
| 6,402,522 B1 | * | 6/2002 | Gabay et al. | 434/322 |
| 7,035,748 B2 | | 4/2006 | Gedlinske et al. | 702/108 |
| 7,300,285 B2 | | 11/2007 | Orr et al. | 434/118 |
| 2002/0016847 A1 | | 2/2002 | Soldis | 709/229 |
| 2003/0228559 A1 | * | 12/2003 | Hajjar et al. | 434/169 |
| 2004/0229199 A1 | | 11/2004 | Ashley et al. | 434/323 |
| 2005/0170325 A1 | | 8/2005 | Steinberg et al. | 434/350 |
| 2006/0073460 A1 | | 4/2006 | Holubec | 434/322 |
| 2006/0078863 A1 | | 4/2006 | Coleman et al. | 434/322 |
| 2006/0084049 A1 | | 4/2006 | Lucas | 434/323 |
| 2006/0088811 A1 | | 4/2006 | Park et al. | 434/362 |
| 2006/0110718 A1 | | 5/2006 | Lee et al. | 434/350 |
| 2006/0134592 A1 | | 6/2006 | Leacock | 434/322 |
| 2007/0099168 A1 | * | 5/2007 | Nielsen | 434/353 |
| 2007/0298385 A1 | * | 12/2007 | Jenkins et al. | 434/156 |
| 2009/0098523 A1 | * | 4/2009 | Shahriari | 434/327 |

FOREIGN PATENT DOCUMENTS

EP     1585086 A1     10/2005

* cited by examiner

*Primary Examiner* — Robert J Utama
*Assistant Examiner* — Sadaruz Zaman
(74) *Attorney, Agent, or Firm* — Kermit D. Lopez; Luis M. Ortiz; Tuesday A. Kaasch

(57) ABSTRACT

A system and method for generating a test and an answer key to identify correct answers is disclosed. A test can be created by entering a set of questions with answer choices and correct answers at the same time. The tests can be rendered via a rendering device that includes both the questions and the answer choices. A ticket can be generated that drives a CNC (computer numerically control) machine to create a punched answer key with holes that align over correct answers. The answer key can also be rendered on a transparency utilizing a solid color everywhere except an area where the correct answer should be marked. The test and the answer key can also be rendered and aligned side by side in order to identify correct answers.

14 Claims, 6 Drawing Sheets

TEST AND ANSWER KEY GENERATION SYSTEM AND METHOD

TECHNICAL FIELD

Embodiments are generally related to data-processing systems and methods. Embodiments also relate in general to the field of computers and similar technologies and, in particular to, software utilized in this field. Embodiments are also related to rendering devices such as printers, scanners, fax machines, copy machines, and the like. In addition, embodiments relate to methods and systems for generating tests and answer keys.

BACKGROUND OF THE INVENTION

Educational software that tests a user's knowledge, coupled with immediate scoring of answers, is known in the art. Tests have been utilized as a means to allow students to determine their degree of understanding of subjects and to help teachers and organizations assess the abilities and knowledge of the students. Hence, many educational programs are designed with built-in tests having an underlying educational purpose. Accordingly, terms such as "student," "player," or "test-taker" can be understood to mean any participant in, or user of, educational software programs that tests the user's knowledge in a formal or informal manner. The educational programs provide a number of multiple-choice questions to be answered by the user through a course of study. Generally, the course of study will include textual material as well as a number of multiple-choice questions. The user can check the level of comprehension by answering the questions and then checking the answers.

Typical methods utilized to identify correct and incorrect answers on a test are manual methods and they do not combine tests and answer keys. Teachers have to generate tests and answer keys separately. In each of these manual methods, the usual procedure involves the use of some physical means of identifying the correct and incorrect answers. As these methods are manual in nature, they do not provide techniques that ensure accurate accounting of test results; nor do such manual techniques provide ways to dynamically track the correct and incorrect answers on a test. Consequently, mistakes can be easily made as such manual methods increases the chance of human errors. The answer keys are hard to generate by such manual methods and also not easy to utilize for grading purpose.

Based on the foregoing, it is believed that a need exists for an improved method and system for generating a test and an answer key to identify correct answers, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium.

It is another aspect of the present invention to provide for an improved method and system for generating test and answer key to identify correct answers.

It is a further aspect of the present invention to provide for an improved method and system for rendering the test and answer key.

The aforementioned aspects and other objectives and advantages can now be achieved as described herein. A system and method for generating a test and an answer key to identify correct answers is disclosed. A test can be created by entering a set of questions with answer choices and correct answers at the same time. The tests can be rendered (e.g., printed) via a rendering device (e.g., a printer) that includes both the questions and the answer choices. A ticket can be generated that drives a CNC (computer numerically control) machine to create a punched answer key with holes that align over correct answers. The answer key can also be rendered on a transparency utilizing a solid color everywhere except an area where the correct answer should be marked. The test and the answer key can also be rendered and aligned side by side in order to identify correct answers.

Such an approach can be implemented as a software application program, which collects information about the set of questions to coordinate the test with the answer key. The software application also drives the CNC machine to generate answer keys that aid the grader in quickly identifying the correct answer. The teaching software application incorporates an easy to generate and easy to utilize answer key and an error free solution in order to reduce mistakes when coordinating the test questions with the test answers.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
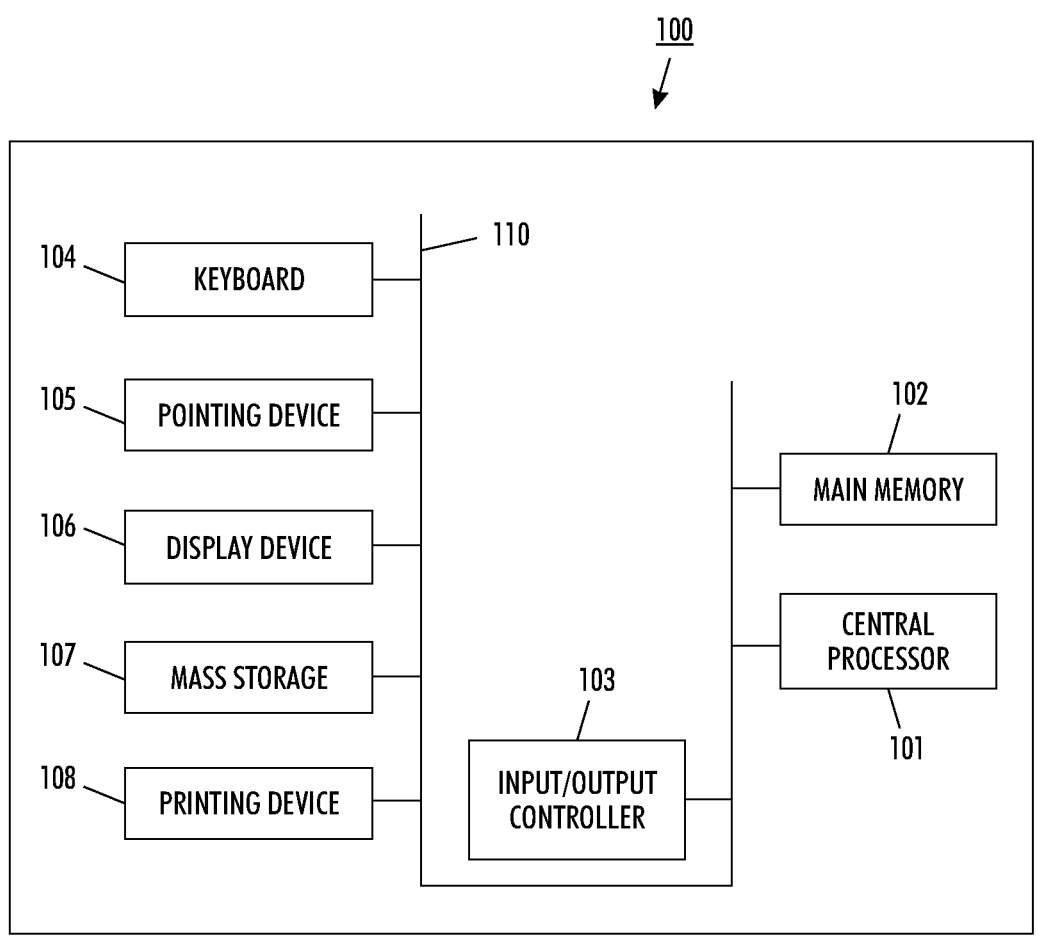
FIG. 1 illustrates a schematic view of a computer system in which the present invention may be embodied.
Figure 2:
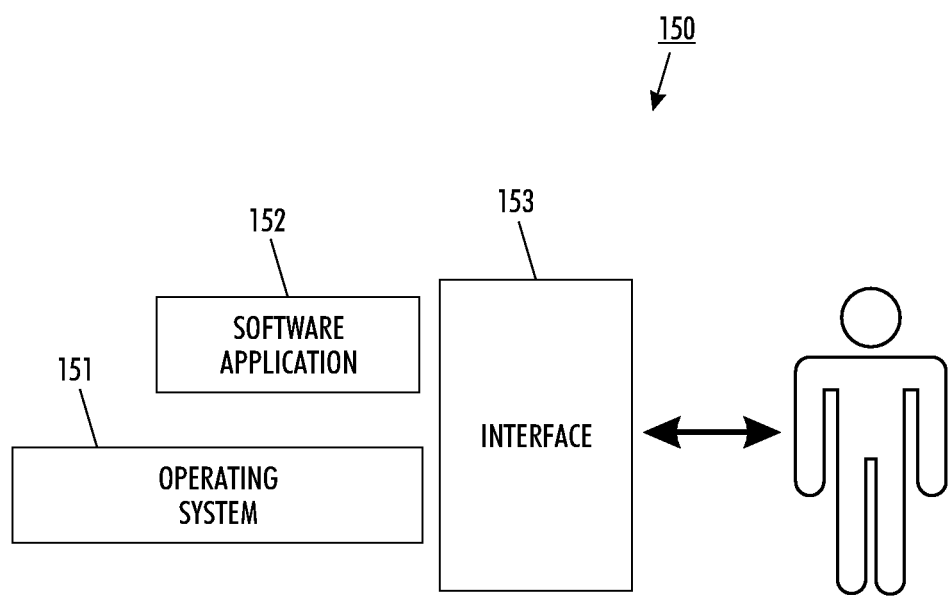
FIG. 2 illustrates a schematic view of a software system including an operating system, application software, and a user interface for carrying out the present invention.
Figure 3:
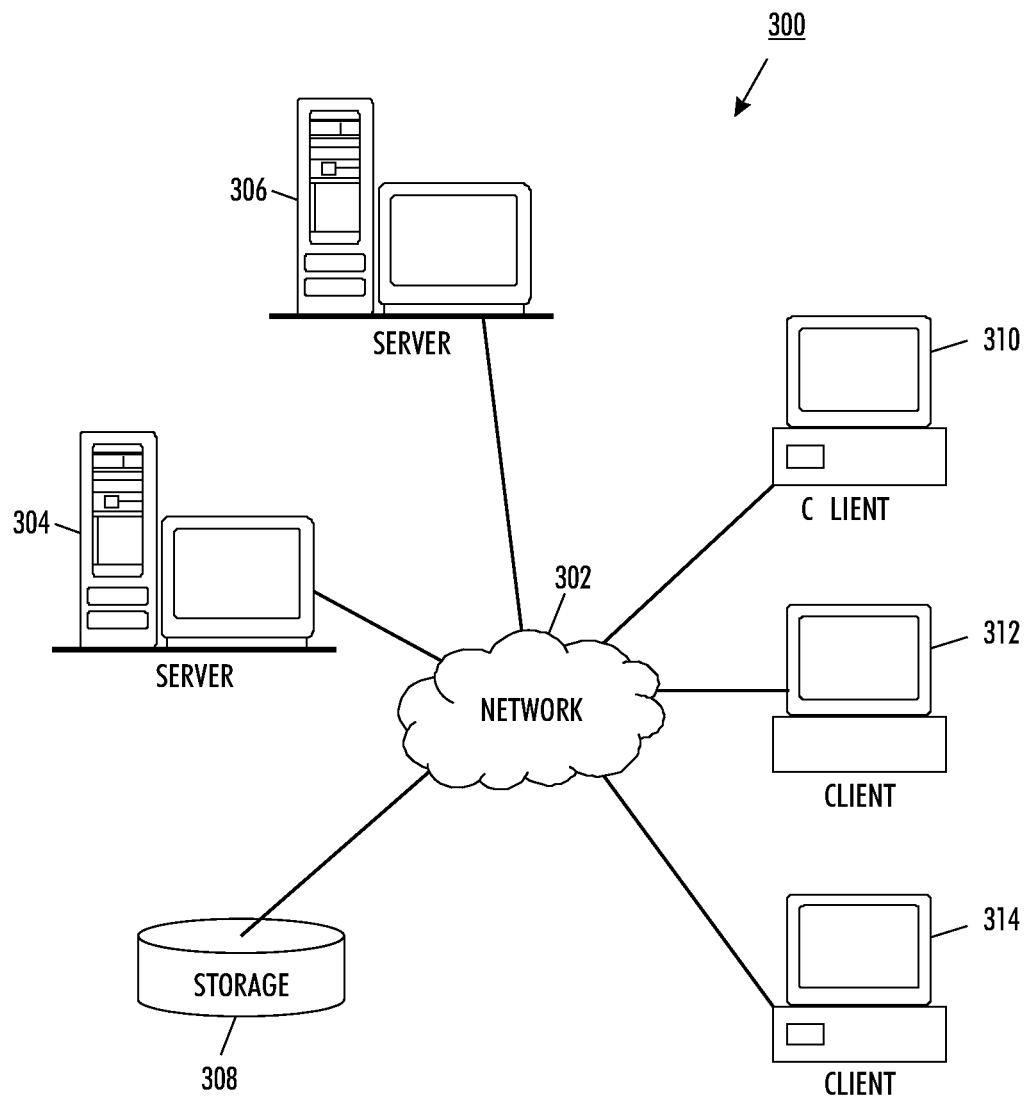
FIG. 3 illustrates a graphical representation of a network of data processing systems in which aspects of the present invention may be implemented.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

Figure 4:
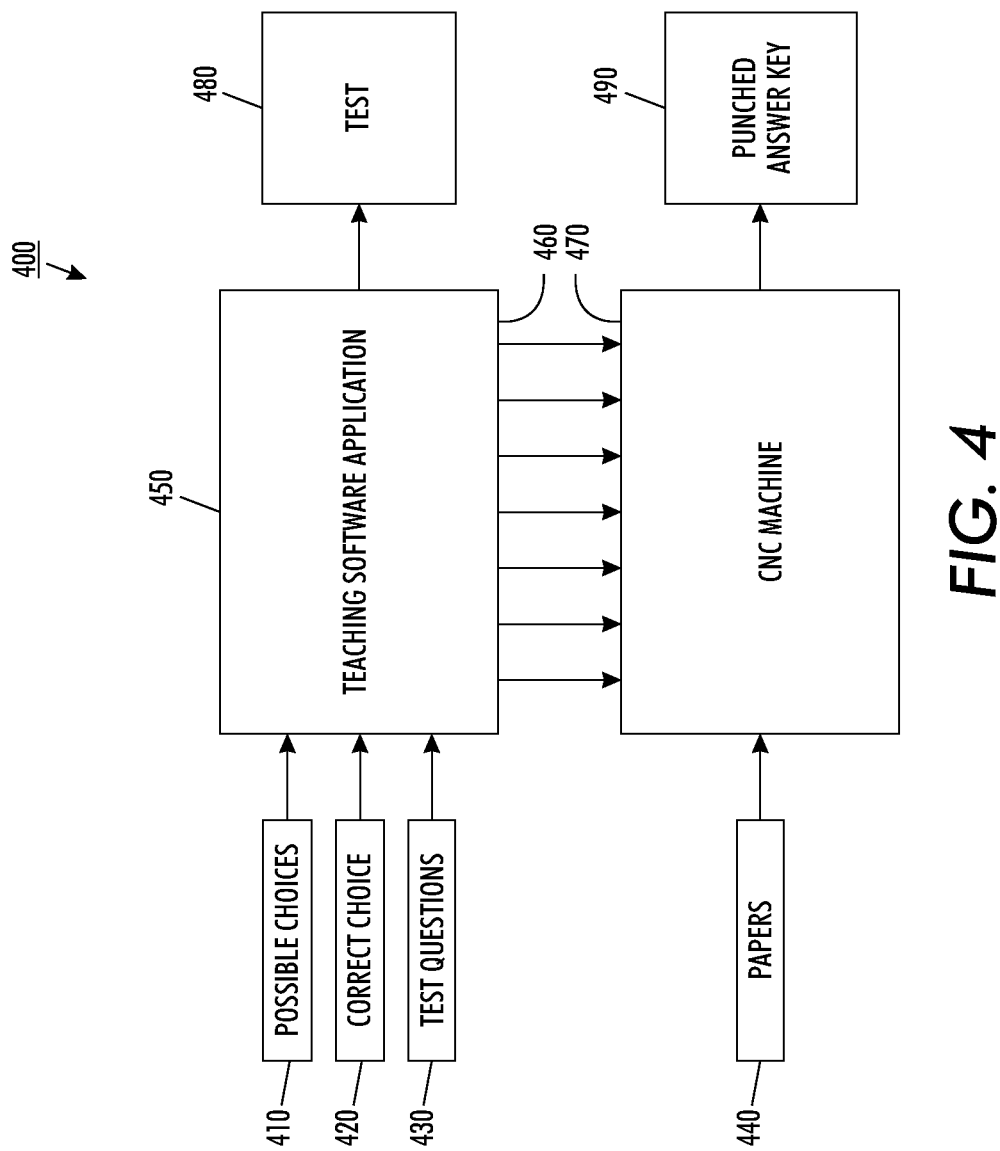
FIG. 4 illustrates a block diagram of a teaching software application module to generate a test and a punched answer key to identify correct answers, in accordance with a preferred embodiment.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108, may be included in the data-processing apparatus 100 as desired. As illustrated, the various components of the data-processing apparatus 100 communicate through a system bus 110 or similar architecture. Note that rendering device 108 may constitute, for example, a printer, a copier, fax machine, scanner, and/or other types of rendering components, depending upon design considerations. The main memory 102 can also include teaching application software 450, as shown in FIG. 4, which generates a test and answer keys to identify correct and incorrect answers. Such teaching application software 450 is accessible by central processor 101 and can be run/processed via such a processor.

Illustrated in FIG. 2, a computer software system 150 is provided for directing the operation of the data-processing apparatus 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the data-processing apparatus 100. The application software 152 can be the teaching application software 450, as illustrated in FIG. 4. The data-processing apparatus 100 receives user commands and data through user interface 153; these inputs may then be acted upon by the data-processing apparatus 100 in accordance with instructions from operating module 151 and/or application module 152.

The interface 153, which is preferably a graphical user interface (GUI), also serves to display results, whereupon the user may supply additional inputs or terminate the session. In an embodiment, operating system 151 and interface 153 can be implemented in the context of a "Windows" system. Application module 152, on the other hand, can include instructions, such as the various operations described herein with respect to the various components and modules described herein, such as, for example, the method 500 and 600 depicted in FIGS. 5-6.

FIG. 3 illustrates a graphical representation of a network of data processing systems in which aspects of the present invention may be implemented. Network data processing system 300 is a network of computers in which embodiments of the present invention may be implemented. Network data processing system 300 contains network 302, which is the medium used to provide communications links between various devices and computers connected together within network data processing apparatus 100. Network 302 may include connections, such as wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing apparatus 100, depicted in FIG. 1, can be, for example, a client such as client 310, 312, and/or 314. Alternatively, data-processing apparatus 100 can be implemented as a server, such as servers 304 and/or 306, depending upon design considerations.

In the depicted example, server 304 provides data, such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers which provide equivalent content.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 300 also may be implemented as a number of different types of networks such as, for example, an intranet, a local area network (LAN), or a wide area network (WAN). FIG. 1 is intended as an example and not as an architectural limitation for different embodiments of the present invention.

The following description is presented with respect to embodiments of the present invention, which can be embodied in the context of a data-processing system such as data-processing apparatus 100, computer software system 150, data processing system 300, and network 302, depicted respectively FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

FIG. 4 illustrates a block diagram 400 of a teaching software application module 450 to generate a test 480 and a punched answer key 490 to identify correct answers, in accordance with a preferred embodiment. The teaching software application 450 can be a test generation application whereby a test 480 can be created by entering a number of test questions 430 with a number of possible choices 410 and a correct choice 420 for the test questions 430. The test 480 comprising the test questions 430 with possible choices 410 can be printed utilizing a printing device 108, as depicted in FIG. 1. The teaching software application 450 also generates a program for controlling a CNC (computer numerically control) machine 470. The teaching software application 450 provides a set of instructions 460 to the CNC machine 470 to generate a punched answer key 490. A number of papers 440 can be fed to the CNC machine 470 along with the set of instructions 460 from the teaching software application 450. A ticket can be generated that drives the CNC machine 470 to create the punched answer key 490 with holes that align over the correct choice 420.

The CNC machine 470 can be driven by the set of instructions 460 from the software application 450. The CNC machine 470 operates by reading the code included in a computer-controlled module, which drives the machine tool and performs the functions of forming holes on the paper. The CNC machine 470 places holes in the answer key 490 that align with the correct choice on the printed test 480. The CNC machine 470 can be controlled directly by the set of instructions 460 from the software application 450, so that a part or assembly can go directly from design to manufacturing without the need of producing a drafted paper drawing of the manufactured component. A drilling cycle is used to repeat drilling or punching operations on the answer key 490. The drilling cycle accepts a list of parameters about the operation, such as depth and feed rate. A set of coordinates for the hole location that is associated with the correct choice 420 can be provided as input to the CNC machine 470 by the software application 450. The cycle takes care of depth, feed rate, retraction, and other parameters that appear in more complex cycles. After the holes are completed, the machine is given another command to cancel the cycle and resumes operation. The CNC machine 470 can be a variable punch or drill machine to generate holes in the answer keys.

Figure 5:
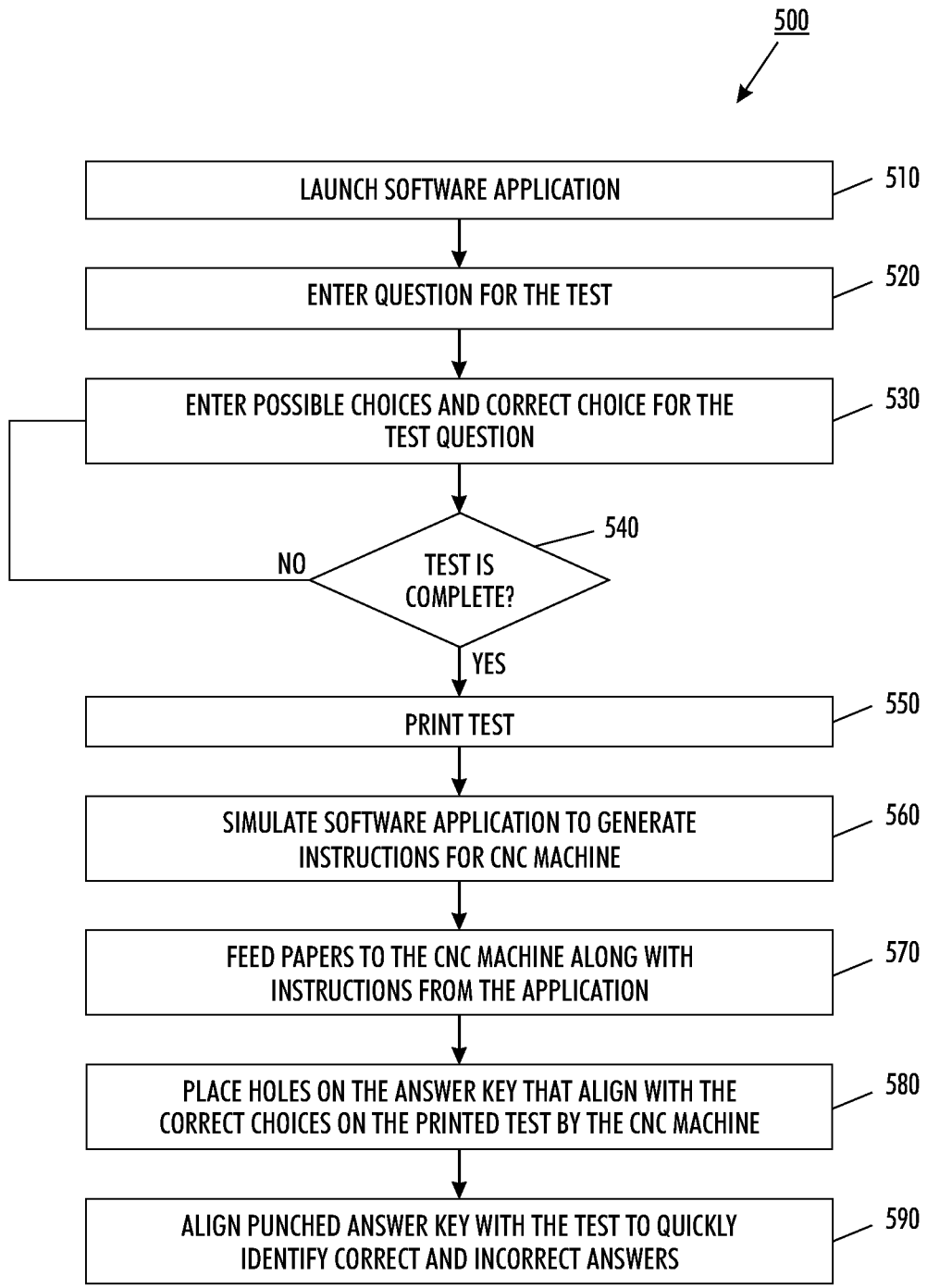
FIG. 5 illustrates a detailed flow chart of operations illustrating logical operational steps of a method for generating a test and a punched answer key, in accordance with a preferred embodiment.

FIG. 5 illustrates a flow chart of operations depicting a method 500 for generating a test 480 and a punched answer key 490 to identify correct answers, in accordance with a preferred embodiment. Note that the method 500 can be implemented in the context of a computer-useable medium that contains a program product. The method 500 depicted in FIG. 5 can also be implemented in a computer-usable medium containing a program product.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 500 described herein can be deployed as process software in the context of a computer system or data-processing system as that depicted in FIGS. 1-3.

Note that as illustrated in FIG. 5, the software application 450 can be launched, as depicted at block 510. The test question 430 can be entered, as depicted at block 520. A number of possible choices 410 and the correct choice 420 for the test question 430 can also be entered, as depicted at block 530. Next, as depicted at block 540, a determination can be made whether the test 480 is complete. If the test 480 is completed, the tests can be printed utilizing the printing device 108, as depicted at block 550. Otherwise, the process can be continued until the test 480 is completed. Thereafter, the software application 450 can be simulated to generate the set of instructions 460 for the CNC machine 470, as depicted at block 560. Next, as depicted at block 570, papers 440 can be fed to the CNC machine 470 along with a set of instructions 460 from the software application 450. Holes can be placed on the answer key 490 that align with the correct choice 420 on the printed test 480 by the CNC machine 470, as depicted at block 580. Thereafter, the punched answer key 490 can be aligned with each test 480 to quickly identify correct and incorrect answers.

Figure 6:
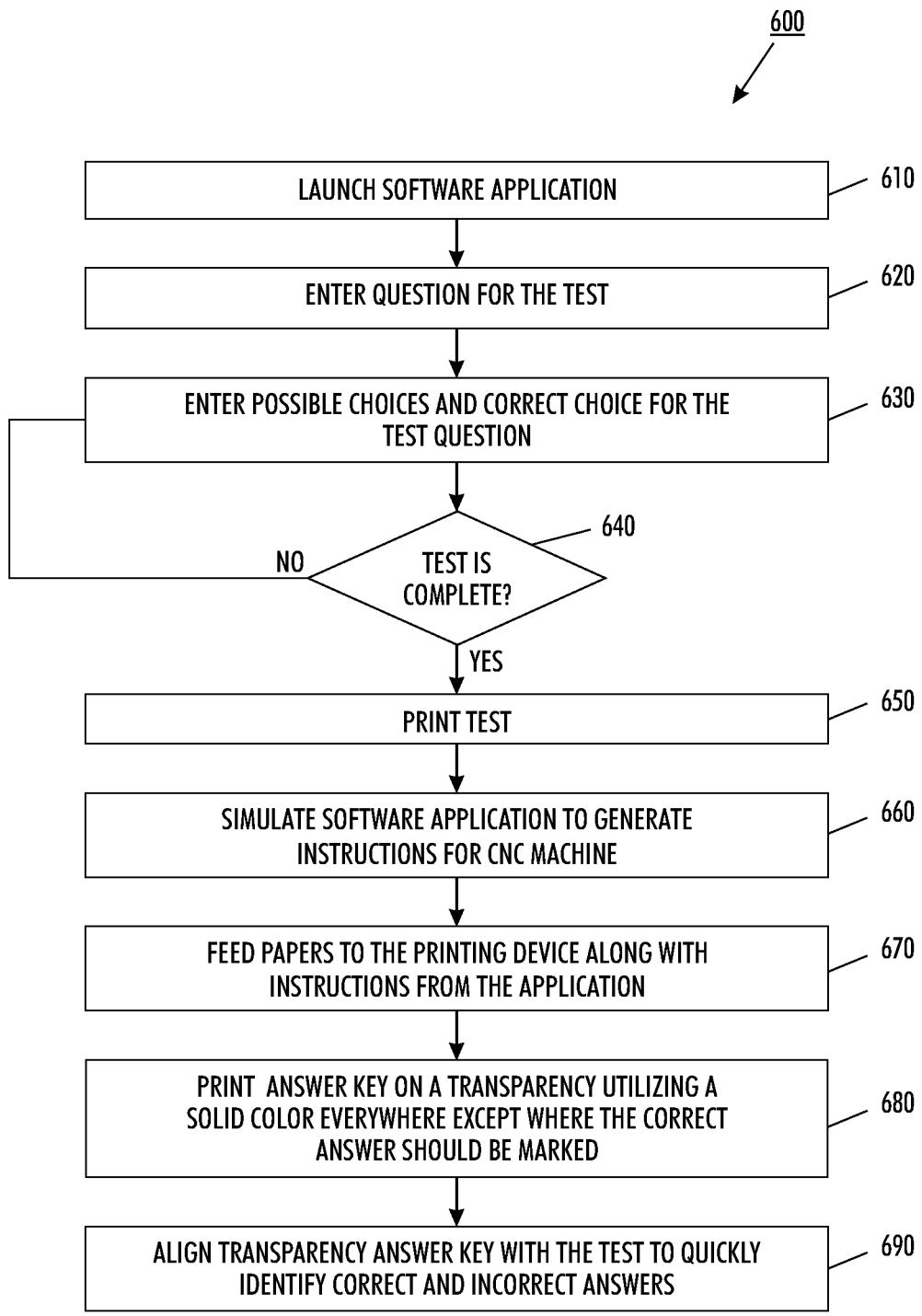
FIG. 6 illustrates a detailed flow chart of operations illustrating logical operational steps of a method for generating a test and a transparency answer key, in accordance with an alternative embodiment.

FIG. 6 illustrates a detailed flow chart of operations illustrating logical operational steps of a method 600 for generating a test 480 and a transparency answer key, in accordance with an alternative embodiment. The software application 450 can be launched, as depicted at block 610. The test question 430 can be entered, as depicted at block 620. A number of possible choices 410 and the correct choice 420 for the test question 430 can also be entered, as depicted at block 630. Next, as depicted at block 640, a determination can be made whether the test 480 is complete. If the test 480 is completed, the test can be printed utilizing the printing device 108, as depicted at block 650. Otherwise, the process can be continued until the test is completed. Thereafter, the software application 450 can be simulated to generate the set of instructions 460 to the printing device 108, as depicted at block 660. Next, as depicted at block 670, papers 440 can be fed to the printing device 108 along with the set of instructions from the software application 450. Thereafter, the answer key can be printed on a transparency utilizing a solid color everywhere except an area where the correct answer should be marked, as shown at block 680. The answer keys can be aligned with each test to quickly identify correct and incorrect answers, as depicted at block 690.

The methods 500 and 600 can be implemented as a software application program 450, which collects information about the set of questions 430 to coordinate the test 480 with the answer key. The software application 450 also drives the CNC machine 470 and the printing device 108 to generate the answer keys. The test 480 and the answer key 490 can also be printed and aligned side by side in order to identify correct answers 420. The teaching software application 450 incorporates an easy to generate and easy to utilize answer key and an error free solution in order to reduce mistakes when coordinating the test questions with the test answers. It is believed that by utilizing the system and method described herein, the chances of making mistakes while coordinating test questions with test answers can be minimized. The system described herein also can be adapted for facilitating a user-friendly answer key that aid the grader in quickly identifying the correct answer.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method of generating a punched answer key, comprising:

creating a test by entering at least one question and a plurality of possible answer choices including a correct answer and rendering said at least one question combined with said plurality of possible answer choices via a rendering device;

generating instructions for said punched answer key based on a location of said correct answer; and providing said instructions to a computer numerically controlled (CNC) machine in order to generate said punched answer key with a plurality of holes wherein said plurality of holes align with said correct answer on said test.

2. The method of claim 1 wherein said CNC machine comprises a variable punch machine.

3. The method of claim 1 wherein said CNC machine comprises a drill machine.

4. A method for creating an answer key, comprising:

creating a test by entering at least one question with a plurality of possible answer choices including a correct answer and printing said at least one question combined with said plurality of possible answer choices via a printing device; and creating an answer key by generating a ticket to drive at least one of a programmable punch machine or computer numerically controlled (CNC) to create an overlay having holes that align over correct answer choices on said test, wherein said plurality of holes align with said correct answer on said printed test enabling identification of said correct answer.

5. The method of claim 4 wherein said CNC machine comprises a variable punch machine.

6. The method of claim 4 wherein said CNC machine comprises a drill machine.

7. The method of claim 6 further comprising providing a plurality of instructions for said printing device in order to generate said transparency answer key on a transparency utilizing a solid color everywhere except an area where said correct answer should be marked.

8. The method of claim 4 further comprising aligning and printing said answer key and said at least one question associated with said test side by side in order to identify said correct answer.

9. A system for generating a test and an associated answer key, said system comprising:

a processor and a data bus coupled to said processor;

a rendering device adapted to render a test including at least one question in combination with a plurality of possible answer choices including a correct answer, wherein said rendering device is capable of electronically communicating with said processor; and a computer-usable medium embodying computer code, said computer-usable medium being coupled to said data bus, said computer program code comprising instructions executable by said processor and configured for creating an answer key for the test by generating a ticket to drive a computer numerically controlled (CNC) machine to create an overlay having holes that align over correct answer choices on said test, wherein said plurality of holes aligns with said correct answer on said test, thereby enabling an identification of said correct answer.

10. The system of claim 9 wherein said CNC machine comprises a variable punch machine.

11. The system of claim 9 wherein said CNC machine comprises a drill machine.

12. The system of claim 9 wherein said instructions are further configured for providing a plurality of instructions for said rendering device in order to generate said transparency answer key on a transparency utilizing a solid color everywhere except an area where said correct answer should be marked.

13. The system of claim 9 wherein said instructions are further configured for aligning and rendering said answer key and said at least one question associated with said test side by side in order to identify said correct answer.

14. The system of claim 9 wherein said rendering device comprises a printer.

* * * * *